(12) United States Patent
Van Gestel

(10) Patent No.: US 7,218,594 B2
(45) Date of Patent: May 15, 2007

(54) RECORDING MEDIUM, AND METHOD OF AND DEVICE FOR RECORDING INFORMATION ON A RECORDING MEDIUM AND READING INFORMATION FROM A RECORDING MEDIUM

(75) Inventor: Wilhelmus Jacobus Van Gestel, Eindhoven (NL)

(73) Assignee: Koninklijke Philips Electronics N.V., Eindhoven (NL)

( * ) Notice: Subject to any disclaimer, the term of this patent is extended or adjusted under 35 U.S.C. 154(b) by 0 days.

(21) Appl. No.: 10/315,814

(22) Filed: Dec. 10, 2002

(65) Prior Publication Data

US 2003/0076762 A1 Apr. 24, 2003

Related U.S. Application Data

(63) Continuation of application No. 09/787,057, filed on Mar. 13, 2001, now Pat. No. 6,526,009.

(51) Int. Cl.
*G11B 20/10* (2006.01)

(52) U.S. Cl. .................................. 369/59.25; 369/53.12

(58) Field of Classification Search ............... 369/30.1, 369/30.11, 30.12, 47.14, 53.15, 53.16, 53.17, 369/53.2, 53.24, 53.42, 53.41, 124.07, 124.08, 369/275.3
See application file for complete search history.

(56) References Cited

U.S. PATENT DOCUMENTS

| | | | | |
|---|---|---|---|---|
| 5,233,584 A * | 8/1993 | Kulakowski et al. | .... | 369/44.27 |
| 5,237,553 A | 8/1993 | Fukushima et al. | ...... | 369/275.3 |
| 5,732,050 A * | 3/1998 | Horie | ...................... | 369/47.14 |
| 5,963,522 A * | 10/1999 | Yamamuro | ............... | 369/47.14 |
| 6,381,710 B1 * | 4/2002 | Kim | ............................ | 714/45 |
| 6,560,055 B1 * | 5/2003 | Nemazie et al. | .............. | 360/53 |

\* cited by examiner

*Primary Examiner*—Paul W. Huber
(74) *Attorney, Agent, or Firm*—Michael E. Belk

(57) ABSTRACT

The invention relates to recording of information, in particular a real-time audio and/or video signal, in a recording track (3) of a recording medium (2) divided into blocks (45). The recording medium contains a defect list (BS) of addresses of blocks (45*) which are known to be defective. This list is read and during the recording process the defective blocks are skipped. The recording process is performed without any read-after-write check so as to speed up the process. The defect list is updated by noting, during playback, which blocks give rise to reading problems and by including the addresses of these blocks in the defect list on the recording medium.

56 Claims, 3 Drawing Sheets

Figure 1:
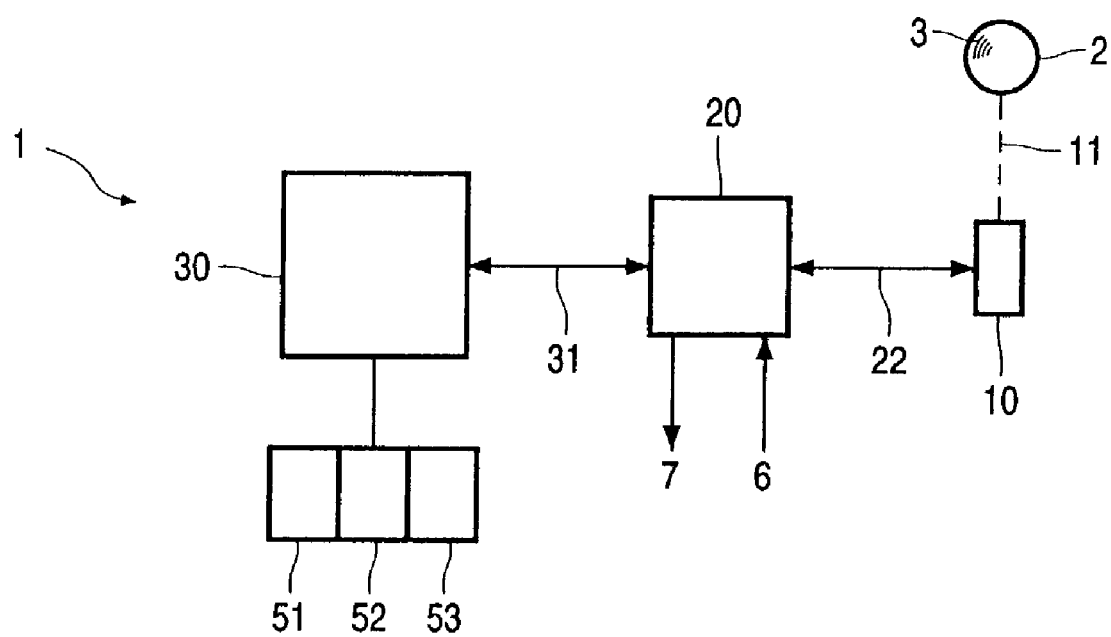

RECORDING MEDIUM, AND METHOD OF AND DEVICE FOR RECORDING INFORMATION ON A RECORDING MEDIUM AND READING INFORMATION FROM A RECORDING MEDIUM

CROSS REFERENCE TO RELATED APPLICATIONS

This is a continuation of application Ser. No. 09/787,057, filed Mar. 13, 2001 now U.S. Pat. No. 6,526,009.

The present invention generally relates to a method of recording information on a recording medium having at least one recording track, which recording track is divided into logic blocks which each have an individual logic address. The recording medium may be, for example, a magnetic or optical recording medium. The present invention typically and particularly though not exclusively relates to recording on an optical disc and will therefore be elucidated with reference to this example of use. However, it is emphasized that the invention is also applicable to other fields of use, such as for example tape recording.

In general, the amount of information to be recorded in a recording session is greater than one block. The information to be recorded, also referred as "file", is then divided into successive data packets having the size of one block, and the successive data packets of a file are recorded in different blocks of the recording medium, which for the sake of simplicity is referred to hereinafter as "recording disc". For a rapid data transfer it is then desirable that the successive data packets are recorded in successive blocks. The recording process can then proceed virtually continuously. Likewise, during the subsequent reading (playback) of the information recorded on the disc the read process can proceed continuously.

In practice, a disc may exhibit defective blocks, i.e. blocks where a faultless recording of information is no longer possible or where any resulting small write errors can no longer be corrected during reading. Such a block is then no longer suited for recording. The only remedy is then to record the data packet that was to be stored in such a defective block in another block.

In a conventional manner the blocks are tested for defects by checking during a write operation whether recording has been effected correctly. Such a check, which is referred to as "read-after-write" check, is in principle carried out on a block-by-block basis, although it is also possible to record a plurality of blocks and subsequently check a plurality of blocks. Basically, a read-after-write test procedure implies that an information packet is stored in a read-after-write memory having the size of one block, which is read out after recording of the block just written, and that the information read from said block is compared with the information packet stored in the read-after-write memory. If these two information packets correspond the conclusion is drawn that recording has been successful and a following information packet may be recorded in a following recording block of the recording track. However, in the case of a difference between the two information packets it is inferred that recording has not been successful and the recording of the relevant information packet is repeated. A new recording attempt, also termed a "retry", may be effected in the same block but if after a given number of retries the recording in this block still fails, this block is considered to be a defective block in which recording is not possible and the recording of the relevant information packet proceeds in another block. In this way it is achieved that the information is recorded in a reliable manner.

A recording method utilizing such a read-after-write test procedure and a possible new recording attempt in order to repair damaged information requires comparatively much time. Such a recording method is therefore less suitable for uses where an information stream with a high data rate is to be recorded. Such a use is, for example, a real-time recording of audio and/or video signals.

It is an object of the present invention to provide a recording method and recording apparatus which are more suitable for the recording of information streams with a high data rate, particularly real-time recording of audio and/or video signals.

The present invention more particularly aims at providing an apparatus of the afore-mentioned type which is suitable as a digital audio and/or video recorder.

It is known per se that a recording apparatus is adapted to first examine the quality of the recording blocks in a test cycle prior to the actual recording process. If defective blocks are detected the sequence numbers or addresses of these blocks are stored in a memory and, subsequently, this memory is addressed during the actual recording process and the defective blocks are skipped. However, testing is again effected with the aid of a read-after-write process and, as a result, the test cycle requires much time before the actual recording process can start.

In accordance with a first major aspect of the present invention the recording medium itself contains a list of addresses of defective blocks. This list is present in a file which should never be overwritten. For this purpose this file may be situated in a predetermined portion of a recording track but, alternatively, this file may have a predetermined name and the recording apparatus is adapted to use the file having this name exclusively for the recording of addresses of defective blocks.

In accordance with another major aspect of the present invention the recording apparatus is adapted to read said file prior to a recording session and to store the block addresses specified therein in an auxiliary memory and to read said auxiliary memory during the recording session and to skip the blocks whose addresses appear in this auxiliary memory during recording.

This prevents recording attempts being made for blocks which are already known as defective blocks. Thus, no time is lost with recording attempts which are doomed to fail.

It is known per se that during the read-out of information (playback) errors may occur, in view of which a read apparatus includes an error correction system, and error correction information for use in this error correction system is recorded during the recording of the data packet. Such an error correction system enables comparatively small errors to be corrected. These errors may have occurred during recording and may be present on the recording medium itself, or they may be produced during reading without an error being present on the recording medium. The extent to which such errors can be corrected depends on the error correction system used; since error correction systems are known per se and the present invention can be used in conjunction with known error correction systems, no detailed explanation of an error correction system will be given herein.

In accordance with a further major aspect of the present invention the quality of the data packets read from each block read during the read-out of the information (playback) is monitored. If a given data packet is found to exhibit incorrigible errors or if reading of a block fails completely, but preferably also if the number of corrigible errors appearing in one block is greater than a predetermined acceptance limit, the address of the relevant block is stored in a second auxiliary memory. After completion of the playback session the blocks whose addresses have been stored are tested. During such a test a standard read-after-write operation is carried out for these blocks in the course of the test process.

The test process for each block includes a step in which a restoration attempt is made. This block is then read one more time, the data packet thus read being presented to the error correction system. If the error correction system is capable of actually correcting the error the restored data is recorded in the relevant block instead of the information just read out, after which a standard read-after-write operation is performed for the restored data in order to ascertain whether recording has taken place in a satisfactory manner. Thus, the error is corrected actively, as a result of which less errors occur during a subsequent read-out and the delay in the data transmission owing to the need for error correction is smaller.

However, if the error correction system cannot correct the error in the information read, it is examined whether the error is merely a non-recurrent write error in an otherwise faultless block, or whether the recording block itself is defective. For this purpose, a predetermined data pattern or code word is recorded in the relevant block, after which a standard read-after-write operation is performed for said code word in order to check whether recording has been effected correctly. If this is the case, the block is apparently not defective; during a subsequent read cycle the code word is recognized as a "dummy". Otherwise, the relevant block is definitively marked as being defective, for which purpose the address of this block is recorded in said file on the recording medium. As has been explained hereinbefore this prevents this block from being addressed during a subsequent recording session.

Furthermore, it is also possible to skip the restoration step and to include each block whose address has been noted during playing in the list of defective blocks as a standard procedure. As a result of this, the apparatus will be ready more rapidly at the end of a playback session but, on the other hand, a comparatively large number of blocks is labeled as being defective, which eventually results in an unnecessary reduction of the storage capacity of the recording medium.

Figure 2:
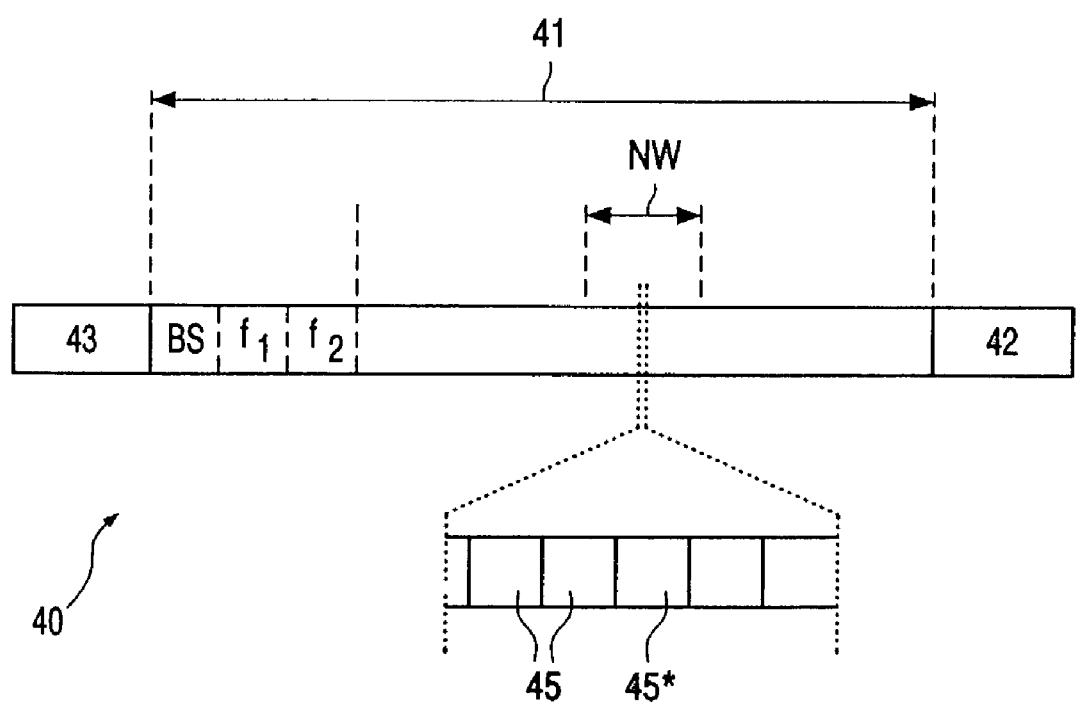
Figure 3:
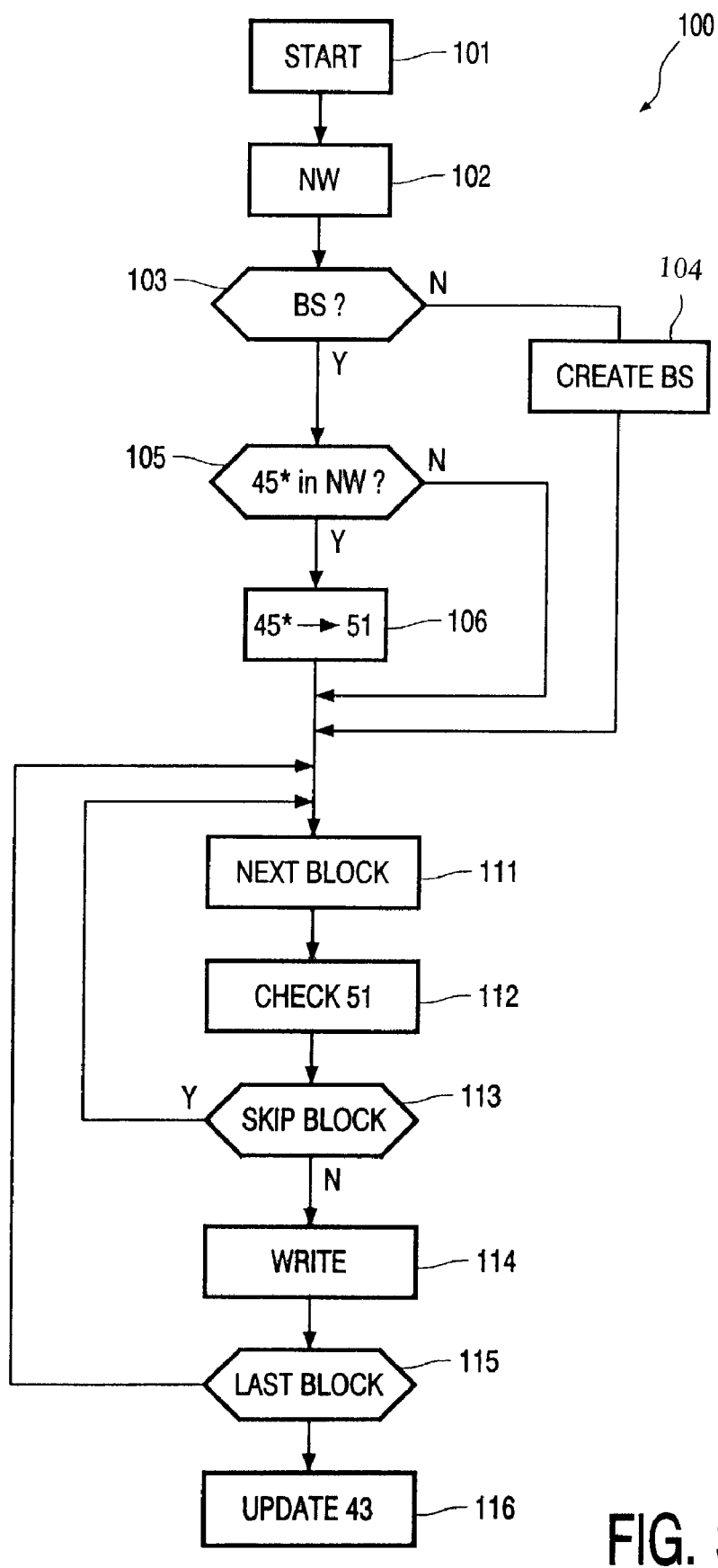
Figure 4:
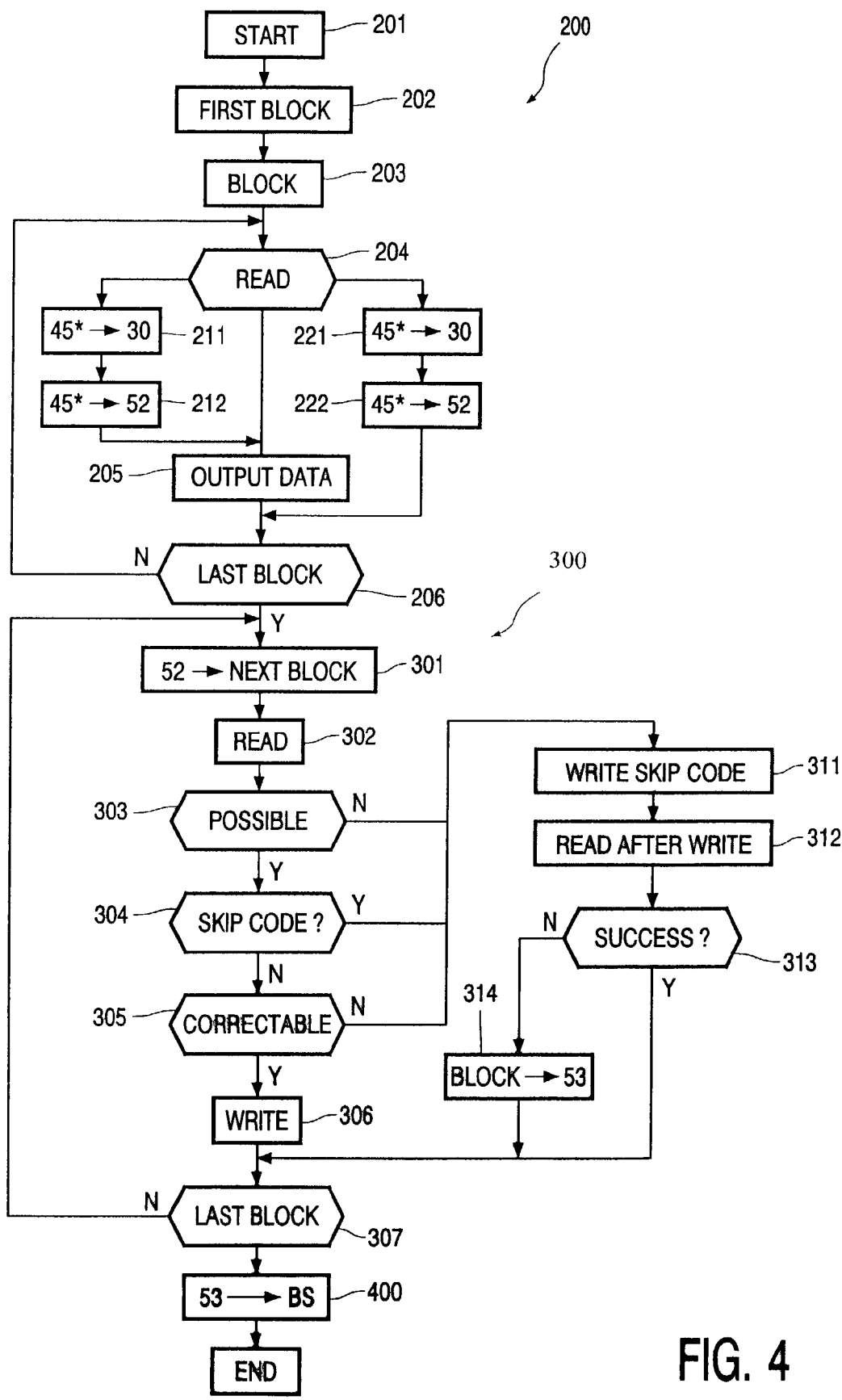

These and other aspects, features and advantages of the present invention will be elucidated further by means of the following description of a preferred embodiment of a recording apparatus and a recording method in accordance with the invention with reference to the drawings, in which identical or similar parts bear the same reference symbols and in which:

FIG. 1 diagrammatically shows an apparatus adapted to record information on a recording disc and to play back a recording disc;

FIG. 2 diagrammatically shows the logic structure of a recording medium;

FIG. 3 is a flow chart of a recording method in accordance with the present invention; and FIG. 4 is a flow chart of playback method in accordance with the present invention.

FIG. 1 diagrammatically shows an apparatus 1 for inscribing and reading a disc-shaped recording medium or recording disc 2. The apparatus has an input 6 for receiving information to be recorded on the disc 2, for example a real-time video and/or audio signal, and an output 7 for supplying a signal read from the disc 2 in a read cycle. Obviously, the input 6 and the output 7 may be combined to form a combined input/output.

The disc 2 may be a magnetic recording disc, for example a hard disc, in which case the apparatus 1 is a magnetic recording/read apparatus. The disc 2 may also be an optical recording medium, for example a CD-RW, in which case the apparatus 1 is an optical recording/read apparatus. It is to be noted that the invention not exclusively relates to disc-shaped recording media but also to, for example, recording tape.

The disc 2 has a multitude of mutually concentric recording tracks 3, which are assumed to be individual circular tracks hereinafter but it is likewise possible that the tracks 3 represent one continuous spiral track. As is known per se, the apparatus 1 has an optical write/read head 10 and a turntable, which is not shown for the sake of simplicity and which faces the head 10, on which turntable the disc 2 can be positioned and by means of which the disc 2 can be given a rotational movement with respect to the head 10, thus enabling a track 3 to be scanned by the head 10. The recording apparatus 1 further includes means, which are known per se and which are not shown for the sake of simplicity, for moving the head 10 in a radial direction of the disc 2, thus enabling different tracks 3 of the disc 2 to be accessed by the head 10. As is well-known, information is written in the track 3 by means of a laser beam 11 from the head 10 in the case of optical recording.

The write process, as well as the read process, is controlled by a functional unit 20, referred to hereinafter as the write/read control unit. Such a write/read control unit 20 is known per se and is therefore not described any further. It is to be noted merely that the write/read control unit 20 is adapted to control the positioning of the head 10 with respect to the disc 2 in such a manner that the write process or the read process takes place at a desired location on the disc 2 through control of said turntable for the disc 2 and said positioning means for the write head 10. Furthermore, the write/read control unit 20 control the intensity of the laser beam 11 in dependence on the input signal S to be recorded. This control function of the write/read control unit 20 is represented diagrammatically as the coupling 22 in FIG. 1.

The recording apparatus 1 further has a functional unit 30, hereinafter termed the allocation manager. Such an allocation manager 30 is know per se and is therefore not described any further. It is to be noted merely that the allocation manager 30 is adapted to determine on which part of the disc 2 a certain recording session or recording is to take place. When a user starts a recording the allocation manager 30 determines whether there is enough space for the recording on the relevant disc 2, and if this is the case, where this space is available. The allocation manager 30 informs the write control unit 20 of the starting location of this available space, which is represented diagrammatically as the signal coupling 31.

Since magnetic and optical recording are processes which are known per se and possible constructions for a magnetic recording medium 10 or an optical recording medium 10 are known per se, while moreover magnetic and optical recording/read apparatuses 1 are known per se, they will not be described here in any further detail.

FIG. 2 diagrammatically represents the logic structure of the disc 2. The recording tracks 3 together define a recordable area 40 of the disc 2, which is shown as a continuous strip in FIG. 2 and which will also be referred to hereinafter as the recording area.

The recording area 40 of the disc 2 has been divided into logic blocks 45, which each have an individual predetermined address. The reference symbol 45* refers to a defective block. The value of the relevant address of a block 45 has been recorded in a predetermined address field of the block 45. It is thus possible to record information directly at a given location which corresponds to a given address on the disc 2 and it is likewise possible to read the information directly from a given location which corresponds to a given address. The blocks 45 have a block size which needs not be equal for all the blocks. The amount of data that can be written in one block is termed a data packet.

The recording area 40 consists for a substantial part of a so-called addressable space 41, which can be accessed by a user in order to record information and will therefore also be referred to hereinafter as the user area. The information in the user area 41 is arranged in logic files f1, f2 etc., each file corresponding to a recording session. Each file may involve a large number of blocks 45, the successive data packets in a file generally corresponding to successive blocks 45 of the user area 41.

The recording area further includes an area 43 reserved for administrative information relating to the disc 2 and the information recorded on this disc. This area 43 will also be referred to hereinafter as the administrative area 43. The administrative area 43 inter alia includes a table of contents relating to the files recorded on the disc 2, which table specifies the start address, the length, the name etc of each file. Normally, the name of each file may be chosen freely by the user. However, in accordance with a major aspect of the present invention the disc 2 has at least one file in the user area 41 to which the user has no access and which has a pre-defined standard name, the standard name chosen in the present case being "BS". The file BS has a non-critical physical location in the user area 41; in FIG. 2 the file BS is shown at the beginning of the user area 41 but this is not necessary. It is of importance only that the location of the file is known and that this file is protected against erasing and overwriting by a user.

The recording area 40 of the disc 2 may further include a spare area 42 reserved for replacement recording, but this is not of relevance to the present invention. In accordance with a further major aspect of the present invention the file BS contains a list of addresses of blocks in the free recording area 41 which are known to be defective. This list is also referred to as defect list. The defect list may be implemented in the form of an initially empty memory in which only the sequence numbers or addresses of defects are stored. It is also possible to implement the defect list in the form of a memory having a predetermined number of storage locations, each storage location corresponding to the sequence number of one specific recording track and the content of this storage location being indicative of whether the relevant recording track is defective or not defective; each of the storage locations need then comprise only one bit.

Furthermore, in accordance with a major aspect of the present invention the recording apparatus 1 is adapted to detect, prior to the recording of information on the disc, whether the disc 2 has a file named BS and, if this is the case, to revert to the content of this file BS in order to find out addresses of defective blocks and to skip these blocks during the subsequent write process.

The operation of a write/read apparatus 1 in accordance with the invention will be described in more detail with reference to the flow charts of FIGS. 3 and 4.

In a step 101 of a recording cycle 100 the apparatus 1 receives a recording command from the user. The allocation manager 30 is adapted to determine then in a step 102 which part of the user area 41 of the recording area 40 of the disc 2 has already been used for previous recordings and defines an area NW where recording can be effected in the non-used portion of the user area 41.

The allocation manager 30 is adapted to address the administrative area 43 of the recording area 40 of the disc 2 in a step 103 and to examine whether the disc 2 contains a file named "BS". The allocation manager 30 is adapted to create a file BS in a step 104 if it appears in the step 103 that the disc 2 does not yet contain such a file. If in the step 103 it is found that there is a file named "BS" the allocation manager 30 refers to the defect list of the file BS in a step 105 in order to examine which blocks in the area NW defined for recording are known to be defective. In a step 106 the allocation manager 30 stores the addresses of the defective blocks 45* found in the area NW in a first auxiliary memory 51.

For the purpose of illustration it is now assumed that this is the first time that a recording is going to be made in this area NW. This means that there is not yet any information is available about the blocks 45 in this area NW being defective or not. Consequently, no block addresses are now stored in the first auxiliary memory 51.

After these preparations, which require a comparatively short time, the actual recording process is started. In a step 111 the allocation manager 30 determines the next block address (at the start: the first block address) in the area NW defined for recording. In a step 112 the allocation manager 30 checks whether this block address appears in the first auxiliary memory 51. If this is the case, the relevant blocks is known to be defective and in a step 113 it is decided to skip this block, upon which the allocation manager 30 returns to the step 111. In the other case a new data packet of the signal or information stream received at the input 6 is written into the relevant block 45 in a step 114. If the recording has not yet been completed in a step 115 the allocation manager 30 returns to the step 111.

Let it be assumed that the area NW does contain such a defective block 45*. Since, as assumed, this information was not yet known before the start of the recording process and, consequently, the block address of this defective block 45* has not yet been stored in the first auxiliary memory 51, a data packet will be written to this defective block 45*. Thus, in accordance with a major aspect of the present invention a data packet is written into all the available blocks of the area NW defined for recording and no read-after-write check is carried out during the recording process. As a result of this, the actual recording process is comparatively fast, which is an important advantage of the present invention.

Upon termination of the recording the allocation manager 30, in a step 116, updates the information in the administrative area 43 in a customary manner and, specifically, records the start address and the length and/or the end address of the new recording and a name for this recording.

Let it now be assumed that a user wishes to play back the recording just made. In a step 201 the apparatus 1 receives the appropriate command for this from the user, for which purpose the user enters, for example, a sequence number or the name of a recording selected by him. In a step 202 the allocation manager 30 makes reference to the administrative area 43 in order to obtain the first block address of the selected recording and in a step 203 the allocation manager 30 instructs the write/read unit 20 to read the user area 41 of the disc 2 starting at this first block address, and to transfer the information being read to the output 7 for further processing by, for example, an audio or video reproducing system.

In a step 204 the write/read unit 20 reads the data in the relevant block and determines the quality of the data, which is effected in known manner with the aid of an error correction algorithm. Since such error correction algorithms are known per se it is not deemed necessary to describe an example of such an error correction algorithm.

If in the step 204 the block being read is found to exhibit no errors or only a small number of errors which all appear to be corrigible, the write/read unit 20 proceeds to a step 205 in order to output the information read via the output 7. If the end of the recording has not yet been reached the write/read unit 20, in a step 206, returns to the step 204 to read a following block.

If in the step 204 the block being read is found to exhibit errors which are all corrigible but which appear in such a number that a predetermined limit is exceeded, the write/read unit 20 transfers the relevant block address to the allocation manager 30 in a step 211, upon which the allocation manager 30 stores the relevant block address in a second auxiliary memory 52 in a step 212, which auxiliary memory is also referred to as the "problem memory". Subsequently, the write/read unit 20 proceeds to the step 205 in order to output the information read via the output 7.

If in the step 204 the block to be read appears to be unreadable or to contain at least one incorrigible error or a skip code (whose meaning will be explained hereinafter), the write/read unit 20 transfers the relevant block address to the allocation manager 30 in a step 221, upon which the allocation manager 30 stores the relevant block address in the problem memory 52 in a step 222. It is now possible that the write/read unit 20 proceeds directly to the step 206 and thus skips the step 205, as shown in FIG. 4, in order to inhibit an information output via the output 7. However, it is also possible that the damaged information or the dummy information of the skip code is fed out normally via the output 7, optionally provided with a warning bit as a sign that the information in this block is unreliable. In the last-mentioned case the write/read unit 20 proceeds to the step 205 after the step 222; in fact, the individual steps 221, 222 may then be dispensed with.

If in the step 206 it appears that all the blocks of the requested recording have been read, the playback cycle 200 is terminated.

Preferably, and as illustrated, the allocation manager 30 now proceeds to a restoration cycle 300 in order to attempt to improve the quality of the blocks defined in the problem memory. In a step 301 the allocation manager 30 reads from said problem memory 52 the next block address (at the start: the first block address) of a block 45 where problems have been encountered during playback. In a step 302 the allocation manager 30 reads the data from said block. In a step 303 the allocation manager 30 checks whether reading is possible. If reading appears to be possible the allocation manager 30 checks in a step 304 whether the relevant block contains a skip code. If this appears not to be the case, the allocation manager 30 checks in a step 305, with the aid of an error correction algorithm, whether the block exhibits only corrigible errors. If this is the case, the corrected information is written into the relevant block in a restoration step 306, and it is checked by means of a read-after-write operation whether the restored data has been recorded successfully.

Subsequently, the allocation manager 30 reads the problem memory 52 in a step 307 in order to determine whether the problem memory 52 contains more addresses of problem blocks. If this is the case, the allocation manager 30 proceeds with the step 301.

If in the step 303 it appears that reading of the relevant block is not possible, or if in the step 304 it appears that the relevant block contains a skip code, or if in the step 305 it appears that the relevant block contains at least one incorrigible error, a test is carried out to check whether the relevant block is defective. For this purpose, the allocation manager 30 writes a predetermined data pattern or code word, referred to as "skip code", into the relevant block in a step 311, as a result of which this block can be identified as defective or as a dummy in a subsequent read session. In a step 312 the allocation manager 30 checks by means of a read-after-write operation whether the skip code has been recorded successfully. If in a step 313 the skip code appears to be recorded correctly the conclusion is drawn that the relevant block is not defective and the allocation manager 30 proceeds to the step 307. Otherwise, the conclusion is drawn that the relevant block should be labeled definitively as a defective block 45*, for which purpose the allocation manager 30, in a step 314, stores the address of this block into a third actuator memory 53, which is referred to hereinafter as the "erase memory". After this, the allocation manager 30 proceeds with the step 307.

If in the step 307 it appears that all the blocks whose addresses have been stored in the problem memory 52 have been processed in the restoration cycle 300, the restoration cycle is terminated. The allocation manager 30 then proceeds to an erase step 400, in which the allocation manager 30 writes the addresses from the erase memory 53 into the file BS on the disc 2. If the disc 2 is a disc which does not yet contain a file BS, such a file is created first.

In this way, some blocks of the recording thus read (may) have been restored: during a subsequent read-out a smaller number of read errors may be expected. However, the recording may still contain defective blocks: during a subsequent read-out these blocks will be recognized and no attempt will be made to subject these blocks to an error correction algorithm, as a result of which loss of time is avoided.

When the user no longer wishes to keep the relevant recording he will release the part of the user area 41 occupied by this recording for a subsequent recording. During a subsequent recording session the user is then no longer confronted with these defective blocks in this area because in the step 105 the allocation manager 30 will recognize the defective blocks and will skip these blocks in the step 113.

Thus, the invention provides a very effective method of recording information, particularly real-time audio and/or video information, in a recording track 3 divided into blocks 45 on a recording medium 2. The recording medium contains or is provided with a defect list BS with addresses of blocks 45* which are known to be defective. This list is read and the defective blocks are skipped during the recording process, which is carried out without a read-after-write check in order to increase the speed. The defect list is updated by noting which blocks give rise to read problems during reading of a file and by recording the addresses of these blocks in this defect list on the recording medium after reading.

It will be evident to one skilled in the art that the scope of the present invention is not limited to the examples described hereinbefore but that that various changes and modifications thereto are possible without departing from the scope of the invention as defined in the appended Claims.

Thus, it is possible for example to carry out the steps 311–313 in a separate cycle prior to the erase step 400.

It is likewise possible to simplify and thereby speed up the restoration cycle in that in the step 212 of the playback cycle 200 a block address of a block which contains only corrigible errors is stored in the problem memory 52 and in that in the step 222 of the playback cycle 200 a block address of a block which has been found to exhibit more serious errors is stored in a further auxiliary memory. In such a simplified restoration cycle the step 306 is carried out for the block addresses specified in the problem memory 52 and the steps 311–314 are carried out for the block addresses specified in said further auxiliary memory.

If desired, the restoration cycle 300 may be dispensed with completely, in which case the problem memory 52 is consulted in the erase step 400, instead of the erase memory 53, which may be dispensed with in this variant.

The invention claimed is:

1. A recording medium comprising:
   a recording track for storage of user data containing a recording area divided into blocks having addresses;
   a file of information recorded in sequential blocks of the recording area;
   a block of the sequential blocks contains a predetermined code word indicating that information of the file read from that block contained errors meeting a first error criteria.

2. The recording medium of claim 1, wherein the recording medium further comprises a defect list stored in the recording area, the defect list containing addresses of defective blocks of the recording area, the address of the block containing the code word not being included in the defect list, indicating that after the code word was written to the block, the code word read from the block did not contain errors meeting a second error criteria.

3. The recording medium of claim 2, wherein another block of the recording area contains the code word and the defect list contains the address of the other block indicating that after the code word was written to the other block, the code word read from the other block contained errors meeting a second error criteria.

4. The recording of claim 1 wherein the first error criteria is the same as a second error criteria and includes one or more of: a failure to read the block; and the number of errors contained in the information read from the block exceeds a predetermined list.

5. A method of recording information on a recording medium, comprising:
   providing a recording medium having a recording track provided for user recording of data having a recording area divided into blocks having individual predetermined addresses;
   receiving a command to record information into multiple sequential blocks of a portion of the recording area;
   writing the information into the sequential blocks of the portion of the recording area using the individual predetermined addresses;
   reading the information from the blocks of the portion of the recording area;
   determining whether the information read from at least one of the blocks of the portion contain a code word indicating errors in the at least one block meeting an error criteria; and
   writing into a defect list stored in the recording area, the individual predetermined addresses of the at least one block depending on the determination that information read from the respective blocks of the portion contain errors meeting the error criteria.

6. A method of recording information on a recording medium, comprising:
   providing a recording medium having a recording track for recording of user data having a recording area divided into blocks having addresses;
   receiving a command to record information into multiple sequential blocks of a portion of the recording area;
   writing the information into the sequential blocks of the portion of the recording area;
   reading the information from the blocks of the portion of the recording area;
   determining whether the information read from respective blocks of the portion contain a code word indicating that errors meeting an error criteria; and
   writing into a defect list stored in the recording area, the addresses of blocks depending on the determination that information read from the respective blocks of the portion contain errors meeting the error criteria.

7. A method of recording information on a recording medium, comprising:
   providing a recording medium having a recording track for storing user data having a recording area divided into blocks having addresses;
   receiving a command to record information into multiple sequential blocks of a portion of the recording area;
   recording the information in sequential blocks of a portion of the recording area;
   reading the information from the blocks of the portion of the recording area;
   determining whether the information read from the respective blocks of the portion contain a code word indicating errors meeting an error criteria; and
   writing into a defect list in a defect file with a standard predetermined name stored in the recording area, the addresses of blocks depending on the determination that the information read from respective blocks of the portion contain errors meeting the error criteria.

8. A method of recording information on a recording medium, comprising:
   providing a recording medium having a recording track for storing of user data having a recording area divided into blocks having addresses;
   receiving a command to record information into multiple sequential blocks of a portion of the recording area;
   writing the information into the blocks of a portion of sequential blocks of the recording area;
   reading the information from the blocks of the portion;
   determining whether the information read from respective blocks of the portion contain errors meeting a first error criteria; and
   writing a code word into the blocks depending on the determination that the information read from the respective blocks contain errors meeting the first error criteria.

9. The recording method of claim 8, wherein the information is read from multiple blocks prior to writing code words into respective blocks from which information containing errors meeting the first error criteria was read.

10. The recording method of claim 8, wherein the method further comprises:
    reading the code word from each of the blocks into which the code words were written;

determining whether the code words read from respective blocks contain errors meeting a second error criteria;

writing the address of the blocks into the defect list, depending on the determination that the code word read from the respective block contained errors meeting the second error criteria.

11. The recording method of claim 10, wherein the method further comprises repeating one or more times for each block: the writing of the code word into the block; the reading the code word from the block; and the determining of whether the code word read from the block contained errors meeting the second error criteria; until a predetermined stopping criteria is satisfied.

12. The recording method of claim 10, wherein multiple code words are read from the blocks prior to each writing into the defect list, of the addresses of blocks from which code words containing errors meeting the second error criteria were read.

13. The recording method of claim 10, wherein the code words are read from multiple blocks prior to writing into the defect list, the addresses of blocks from which code words containing errors meeting the second error criteria were read.

14. A method of recording information on a recording medium, comprising:

providing a recording medium having a recording track for storage of user data having a recording area divided into blocks having addresses;

receiving a command to record information into multiple sequential blocks of a portion of the recording area;

writing information into the multiple sequential blocks of a portion of the recording area;

reading the information from the multiple blocks of the portion, after writing the information into the multiple blocks;

determining whether information read from the respective blocks of the portion contain errors meeting a first error criteria;

storing the addresses of the defective blocks of the portion into a memory depending on the determination that the information read from the respective blocks of the portion contain errors meeting the first error criteria;

writing a code word into blocks of the portion depending on the determination file information read from respective blocks of the portion contain errors meeting the first error criteria; and writing into a defect list the address of the defective blocks stored in the memory.

15. The recording method of claim 14, wherein:

the method further comprises: reading the code words written into the blocks; and determining whether code words read from the blocks of the portion contain errors meeting a second error criteria; and the writing into the defect list of the addresses of the blocks depends on the determination that the code words read from the respective blocks of the portion contain errors meeting the second error criteria.

16. The recording method of claim 15, wherein:

the method further comprises writing data to update an administrative area of the media after writing the information into the multiple blocks and before reading the information from the multiple blocks.

17. A method of recording information on a recording medium, comprising:

providing a recording medium having a recording track for storing of user data having a recording area divided into blocks having addresses;

receiving a command to record information into multiple sequential blocks of a portion of the recording area;

recording the information in multiple sequential blocks of a portion of the recording area;

reading the information recorded in the multiple sequential blocks of the portion;

determining whether information read from the multiple sequential blocks of the portion contain errors meeting an error criteria;

storing the addresses of the defective blocks of the portion into a memory depending on the determination that information read from the multiple sequential blocks of the portion contain errors meeting the error criteria;

writing a code word into blocks of the portion upon determination that information read from respective blocks of the portion contain errors meeting the error criteria; and writing into the defect list the addresses of blocks stored in the memory, after completing the reading of the multiple sequential blocks of the portion.

18. A method of playing information from a recording medium, comprising:

providing a recording medium having a recording track for storing of user data having a recording area divided into blocks having individual predetermined addresses;

receiving a command to play information from multiple sequential blocks of a portion of the recording area;

reading the information in sequential blocks of a portion of the recording area using the individual predetermined addresses;

reading the information from the blocks of the portion of the recording area;

determining whether the information read from the blocks of the portion contain errors meeting an error criteria;

writing a code word into blocks of the portion upon determining information read from respective blocks of the portion contain errors meeting the error criteria; and writing into a defect list stored in the recording area, the addresses of blocks depending on the determination that the respective blocks of the portion contain errors meeting the error criteria.

19. A method of playing information from a recording medium, comprising:

providing a recording medium having a recording track for storing of user data having a recording area divided into blocks having addresses;

receiving a command to play information from multiple sequential blocks of a portion of the recording area;

reading the information from the sequential blocks of the recording area, the recording area being the area where information is initially written into the blocks that are not defective;

determining whether the information read from the blocks of the portion contain errors meeting an error criteria;

writing a code word into blocks of the portion upon determination information read from respective blocks of the portion contain errors meeting the error criteria; and writing into a defect list stored in the recording area, the addresses of blocks depending on the determination that the respective blocks of the portion contain errors meeting the error criteria.

20. A method of playing information from a recording medium, comprising:

providing a recording medium having a recording track containing previously recorded user data having a recording area divided into blocks having addresses;

receiving a command to play information from multiple sequential blocks of a portion of the recording area;

reading the information in the sequential blocks of the portion of the recording area;

determining whether the information read from the blocks of the portion contain errors meeting an error criteria;

writing a code word into blocks of the portion depending upon determination that information read from respective blocks of the portion contain errors meets the error criteria; and writing into a defect list in a defect file with a standard predetermined name stored in the recording area, the addresses of blocks depending on the determination that the information read from respective blocks of the portion contain errors meeting the error criteria.

21. A method of playing information from a recording medium, comprising:

providing a recording medium having a recording track containing previously recorded user data having a recording area divided not blocks having addresses;

receiving a command to play information from multiple sequential blocks of a portion of the recording area;

reading information from sequential blocks of a portion of the recording area;

determining whether the information read from the blocks of the portion contains errors meeting a first error criteria; and writing a code word into the blocks depending on the determination that the information read from the respective block contained errors meeting the first error criteria.

22. The playing method of claim 21, wherein multiple information blocks are read prior to writing code words into blocks from which information containing errors meeting the first error criteria was read.

23. The playing method of claim 21, wherein the method further comprises:

reading the code words from that block into which the code words were written;

determining whether the code word read from the blocks contain errors meeting a second error criteria;

writing the address of the blocks into the defect list, depending on the determination that the code word read from the respective block contained errors meeting the second error criteria.

24. The playing method of claim 23, wherein information is read from multiple blocks prior to writing into the defect list, the addresses of blocks from which code words containing errors meeting the second error criteria were read.

25. The playing method of claim 23, wherein the method further comprises repeating one or more times for each block: the writing of the code word into the block; the reading the code word from the block; and the determining of whether the code word read from the block contained errors meeting the second error criteria, until a predetermined stopping criteria is satisfied.

26. A method of playing information from a recording medium, comprising:

providing a recording medium having a recording track containing previously recorded user data having a recording area divided into blocks having addresses;

receiving a command to play information from multiple sequential blocks of a portion of the recording area;

reading information from sequential blocks of a portion of the recording area; and determining whether the information read from each of the blocks contains a code word indicating that information read from the block contained errors meeting a first error criteria; and skipping the playing of blocks depending on the determination that the information read from the respective block contained the code word.

27. A method of playing information from a recording medium, comprising:

providing a recording medium having a recording track containing previously recorded user data having a recording area divided into blocks having addresses;

receiving a command to play information from multiple sequential blocks of a portion of the recording area;

reading information recorded in sequential blocks of a portion of the recording area;

determining whether the information read from the blocks of the portion contained errors meeting an error criteria;

writing a code word into blocks of the portion upon determination information read from respective blocks of the portion contain errors meeting the error criteria and after reading information recorded in multiple blocks of the portion, and uncorrectable error determination for the multiple blocks, writing into the defect list the addresses of blocks depending on the determination of errors meeting the error criteria.

28. A method of playing information from a recording medium, comprising:

providing a recording medium having a recording track containing previously recorded user data having a recording area divided into blocks having addresses;

receiving a command to play information from multiple sequential blocks of a portion of the recording area;

reading information from sequential blocks of a portion of the recording area;

determining whether the information read from the blocks of the portion contained errors meeting an error criteria;

writing a code word into blocks of the portion upon determination information read from respective blocks of the portion contain errors meeting the error criteria; and writing into the defect list the addresses of blocks, depending on the determination that the information read from the respective blocks of the portion contained errors meeting the error criteria.

29. The playing method of claim 28 wherein information is read from multiple blocks of a portion prior to writing to the defect list the addresses of respective blocks from which information containing errors meeting an error criteria was read.

30. The playing method of claim 28 wherein:

the method further comprises: writing a code word in the blocks of the portion depending on the determination that the information read from the blocks of the portion contained errors meeting the error criteria; reading the code words written into the blocks; and determining whether the code words read from the blocks of the portion contained errors meeting the error criteria; and the writing into the defect list of the addresses of the blocks of the portion from which information containing errors meeting the error criteria was read, also depends on the determination that the code word read from the respective blocks of the portion contains errors meeting the error criteria.

31. A recorder for recording user information on a recording medium, comprising:

read/write unit means for reading and writing information into blocks contained in a recording area of a recording track for recording user data on a recording medium, the blocks having individual predetermined addresses;

a memory;

a controller communicating with the read/write unit with means for:

receiving a command to record information into multiple sequential blocks of a portion of the recording area;

causing the writing of the information into the sequential blocks of the portion of the recording area using the individual predetermined addresses;

reading the information from the blocks of the portion of the recording area;

determining whether the information read from the blocks of the portion contain errors meeting an error criteria;

writing a code word into blocks of the portion upon determination information read from respective blocks of the portion contain errors meeting the error criteria; and causing the writing into a defect list stored in the recording area of the individual predetermined addresses of blocks depending on the determination that the respective blocks of the portion containing errors meeting the error criteria.

32. A recorder for recording information on a recording medium, comprising:

read/write unit means for reading and writing information into blocks contained in a recording area of a recording track for recording user data on a recording medium;

a memory;

a controller communicating with the read/write unit with means for:

receiving a command to record information into multiple sequential blocks of a portion of the recording area;

causing the writing of the information into the sequential blocks of the portion of the recording area;

causing the reading of the information from the blocks of the portion of the recoding area;

determining whether the information read from the blocks of the portion contain errors meeting an error criteria writing a code word into blocks of the portion upon determination file information read from respective blocks of the portion contain errors meeting the error criteria; and causing the writing into a defect list stored in the recording area of the addresses of blocks depending on the determination that the respective blocks of the portion contain errors meeting the error criteria.

33. A recorder for recording information on a recording medium, comprising:

read/write unit means for reading and writing information into blocks contained in a recording area of a recording track for recording user data on a recording medium;

a memory;

a controller communicating with the read/write unit with means for:

receiving a command to record information into multiple sequential blocks of a portion of the recording area;

causing the recording of the information in sequential blocks of a portion of the recoding area;

causing the reading of the information from the blocks of the portion of the recording area;

determining whether the information read from the blocks of the portion contain errors meeting an error criteria;

writing a code word into blocks of the portion upon determination information read from respective blocks of the portion contain errors meeting the error criteria; and causing the writing into a defect list in a defect file with a standard predetermined name stored in the recording area, of the addresses of blocks depending on the determination that the information read from respective blocks of the portion contain errors meeting the error criteria.

34. A recorder for recording information on a recording medium, comprising:

read/write unit means for reading and writing information into blocks contained in a recording area of a recording track for recording user data on a recording medium;

a memory;

a controller communicating with the read/write unit with means for:

receiving a command to record information into multiple sequential blocks of a portion of the recording area;

causing the writing of the information into the blocks of the sequential blocks;

causing the reading of the information from the blocks of the sequential blocks into which the information was written;

determining whether the information read from the blocks of the sequential blocks contains errors meeting a first error criteria;

storing in the memory the addresses of the blocks depending on the determination that the information read from the respective blocks contained errors meeting the first error criteria;

causing the writing of a code word into the blocks depending on the addresses of the blocks stored in the memory.

35. The recorder of claim 34, wherein the information is read from all the multiple blocks prior to writing code words into blocks from which information containing errors meeting the error criteria was read.

36. The reorder of claim 34, wherein the controller:

causes reading of the code word from each of the blocks into which the code words were written;

determines whether the respective code words read from the blocks contain errors meeting a second error criteria;

causes the writing of the address of the blocks into the defect list, depending on the determination that the code words read from the respective blocks contain errors meeting the second error criteria.

37. The recorder of claim 36, wherein the controller repeats one or more times for each block: causing the writing of the code word into the block, causing the reading the code word from the block, and the determining of whether the code word read from the bock contained errors meeting the second error criteria, until a predetermined stopping criteria is satisfied.

38. The recorder of claim 36, wherein code words are written into all the blocks of the multiple sequential blocks from which information containing errors meeting the first error criteria were read, prior to reading the code words from the blocks.

39. The recorder of claim 36, wherein the code words are read from all blocks of all of the multiple sequential blocks from which information containing errors meeting the first error criteria were read, prior to writing into the defect list, the addresses of blocks from which code words containing errors meeting the error criteria were read.

40. A recorder for recording information on a recording medium, comprising:
  read/write unit means for reading and writing information into blocks contained in a recording area of a recording track for recording user data on a recording medium;
  a memory;
  a controller communicating with the read/write unit with means for:
  receiving a command to record information into multiple sequential blocks of a portion of the recording area;
  causing the recording of information in multiple sequential blocks of a portion of the recording area;
  causing the reading the information recorded in blocks of the portion, after recording the information into the multiple blocks;
  determining whether the information read from the blocks of the portion contained errors meeting an error criteria;
  causing the storing of the addresses of the blocks of the portion that meet the error criteria into a memory;
  writing of a code word in the blocks of the portion depending on the determination that the information read from the blocks of the portion contained errors meeting the error criteria; and
  causing the writing into a defect list of the addresses of the blocks stored in the memory that are determined to be defective depending on the determination that the information read from the blocks of the portion contained errors meeting the error criteria.

41. The recorder of claim 40, wherein:
  the controller: causes the reading of the code words written into the blocks; and determines whether the code words read from the blocks of the portion contained errors meeting the error criteria; and
  the writing into the defect list the addresses of the blocks defect list also depends on the determination that the code word read from the respective blocks of the portion contain errors meeting the error criteria.

42. The recorder of claim 40, wherein:
  the controller causes the writing of data to update an administrative area of the media after the information is written into the multiple blocks and before the information is read from the multiple blocks.

43. A recorder for recording information on a recording medium, comprising:
  read/write unit means for reading and writing information into blocks contained in a recording area of a recording a track for recording user data on a recording medium;
  a memory;
  a controller communicating with the read/write unit means for:
  receiving a command to record information into multiple sequential blocks of a portion of the recording area;
  causing the recording of the information in multiple sequential blocks of a portion of the recording area;
  causing the reading of the information recorded in the multiple sequential blocks of the portion;
  determining whether the information read from the multiple sequential blocks of the portion contained errors meeting an error criteria;
  storing the addresses of the blocks of the portion that contained errors meeting an error criteria into a memory;
  writing of a code word in the blocks of the portion upon determination that the information read from the blocks of the portion contained errors meeting the error criteria; and
  writing into the defect list the addresses of the respective blocks of the multiple sequential blocks of the portion, from which the information containing uncorrectable information was read, after reading the multiple sequential blocks of the portion, that are determined to be defective depending on the determination that the information read from the multiple sequential blocks of the portion contained errors meeting the error criteria.

44. A player of information from a recording medium, comprising:
  read/write unit means for reading and writing information into blocks contained in a recording area of a recording track for recording user data on a recording medium, the blocks having individual predetermined addresses;
  a memory;
  a controller communicating with the read/write unit with means for:
  receiving a command to play information from multiple sequential blocks of a portion of the recording area;
  causing the reading the information in sequential blocks of a portion of the recording area using the individual predetermined addresses;
  reading the information from the blocks of the portion of the recording area;
  determining whether the information read from the blocks of the portion contain errors meeting an error criteria;
  writing of a code word in the blocks of the portion depending on the determination that the information read from the blocks of the portion contained errors meeting the error criteria; and
  writing into a defect list stored in the recording area, the addresses of blocks depending on the determination that the respective blocks of the portion contain errors meeting the error criteria.

45. A player of information from a recording medium, comprising:
  read/write unit means for reading and writing information into blocks contained in a recording area of a recording track for recording user data on a recording medium;
  a memory;
  a controller communicating with the read/write unit with means for:
  receiving a command to play information from multiple sequential blocks of a portion of the recording area;
  causing the reading of the information from the sequential blocks of the recording area, the recording area being the areas where information is initially written into the blocks that are not defective;
  determining whether the information read from the blocks of the portion contain errors meeting an error criteria;
  writing of a code word in the blocks of the portion depending on the determination that the information read from the blocks of the portion contained errors meeting the error criteria; and
  causing the writing into a defect list stored in the recording area, of the addresses of blocks depending on the determination that the respective blocks of the portion contain errors meeting the error criteria.

46. A player of information from a recording medium, comprising:
  read/write unit means for reading and writing information into blocks contained in a recording area of a recording track for recording user data on a recording medium;
  a memory;
  a controller communicating with the read/write unit with means for:
  receiving a command to play information from multiple sequential blocks of a portion of the recording area;
  causing the reading of the information in the sequential blocks of the portion of the recording area;
  determining whether the information read from the blocks of the portion contain errors meeting an error criteria;
  writing of a code word in the blocks of the portion depending on the determination that the information read from the blocks of the portion contained errors meeting the error criteria; and causing the writing into a defect list in a defect file with a standard predetermined name stored in the recording area, the addresses of blocks depending on the determination that the information read from respective blocks of the portion contain errors meeting the error criteria.

47. A player of information from a recording medium, comprising:

read/write unit means for reading and writing information into blocks contained in a recording area of a recording a track for recording user data on a recording medium;

a memory;

a controller communicating with the read/write unit with means for:

receiving a command to play information from multiple sequential blocks of a portion of the recording area;

causing the receiving a command to play information from multiple sequential blocks of a portion of the recording area;

causing the reading information from sequential blocks of a portion of the recording area;

determining whether the information read from the blocks of the portion contains errors meeting an error criteria; and causing the writing of a code word into the blocks depending on the determination that the information read from the respective block contained errors meeting the error criteria.

48. The player of claim 47, wherein multiple information blocks are read prior to writing code words into blocks from which information containing errors meeting the error criteria was read.

49. The player of claim 47, wherein the controller:

causes the reading of the code words from that blocks into which the code words were written;

determines whether the code word read from the blocks contain errors meeting the error criteria;

causes the writing of the address of the blocks into the defect list, depending on the determination that the code word read from the respective block contained errors meeting the error criteria.

50. The player of claim 49, wherein information is read from multiple blocks prior to writing into the defect list, the addresses of blocks from which code words containing errors meeting the error criteria were read.

51. The player of claim 49, wherein the controller repeats one or more times for each block: causing the writing of the code word into the block, causing the reading the code word from the block, and determining of whether the code word read from the block contained errors meeting the error criteria, until a predetermined.

52. A player of information from a recording medium, comprising:

read/write unit means for reading and writing information into blocks contained in a recording area of a recording track for recording user data on a recording medium;

a memory;

a controller communicating with the read/write unit with means for:

causing the reading information from sequential blocks of a portion of the recording area; and determining whether the information read from each of the blocks contains a code word indicating that information read from the block contained errors meeting the error criteria; and skipping the playing of blocks depending on the determination that the information read from the respective block contained the code word.

53. A player of information from a recording medium, comprising:

read/write unit means for reading and writing information into blocks contained in a recording area of a recording track for recording user data on a recording medium;

a memory;

a controller communicating with the read/write unit with means for:

receiving a command to play information for multiple sequential blocks of a portion of the recording area;

causing the reading information recorded in sequential blocks of a portion of the recording area;

determining whether the information read from the blocks of the portion contained errors meeting an error criteria;

writing of a code word in the blocks of the portion upon determination that the information read from the blocks of the portion contained errors meeting the error criteria; and writing into the defect list the addresses of blocks depending on the determination that the information read from the respective blocks contained errors meting the error criteria, after reading multiple blocks of the portion.

54. A player of information from a recording medium, comprising:

read/write unit means for reading and writing information into blocks contained in a recording area of a recording track for recording user data on a recording medium;

a memory;

a controller communicating with the read/write unit with means for:

receiving a command to play information from multiple sequential blocks of a portion of the recording area;

causing the reading of information from sequential blocks of a portion of the recording area;

determining whether the information read from the blocks of the portion contained errors meeting an error criteria;

writing of a code word in the blocks of the portion upon determination that the information read from the blocks of the portion contained errors meeting the error criteria; and causing the writing into the defect list of the addresses of blocks, depending on the determination that the information read from the respective blocks of the portion contained errors meeting the error criteria.

55. The player of claim 54 wherein information is read from multiple blocks of a portion prior to writing to the defect list the addresses of respective blocks from which information containing errors meeting an error criteria was read.

56. The player of claim 54, wherein:

the controller also: causes the writing of a code word in the blocks of the portion depending on the determination that the information read from the blocks of the portion contained errors meeting first error criteria; causes the reading of the code words written into the blocks; and determines whether the code words read from the blocks of the portion contained errors meeting the first error criteria; and the writing into the defect list of the addresses of the blocks of the portion from which information containing errors meeting the error criteria was read, also depends on the determination that the code word read from the respective blocks of the portion contains errors meeting a second error criteria.

* * * * *